Nov. 18, 1969  C. H. MEYERHOEFER  3,478,733
PORTABLE, DISPOSABLE BARBECUE UNIT
Filed May 20, 1968  2 Sheets-Sheet 1

INVENTOR.
CARL H. MEYERHOEFER

INVENTOR.
CARL H. MEYERHOEFER

United States Patent Office 3,478,733
Patented Nov. 18, 1969

3,478,733
PORTABLE, DISPOSABLE BARBECUE UNIT
Carl H. Meyerhoefer, 59 Eastwood Ave.,
Deer Park, N.Y. 11729
Filed May 20, 1968, Ser. No. 730,434
Int. Cl. F24c 1/16; F24b 3/00; A47j 37/07
U.S. Cl. 126—9
4 Claims

ABSTRACT OF THE DISCLOSURE

This invention relates to a portable, disposable barbecue unit. A grill with attached folded support rods and a fuel containing pan with attached folded support rods are packed in a box having support receiving openings at each of its four corners in its top and side surfaces. After the contents are removed, the re-closed box becomes the base for the unit, the grill being supported a fixed distance above it and the fuel containing pan supported at either of two elevations between the grill and the base with its unfolded support rods engaged in the box openings.

---

The object of this invention is to provide a compact lightweight, pre-fueled, portable barbecue unit that after its use may be discarded because of its use of inexpensive easily fabricated materials, thus eliminating the need for an otherwise messy cleanup.

Another object is to provide such a unit that may be assembled with ease and without the use of tools.

A further object is to enable the user to adjust the height of the grill above the fuel to desired predetermined spacing.

Other objects will appear from the description which follows and the drawings in which.

Figure 2:
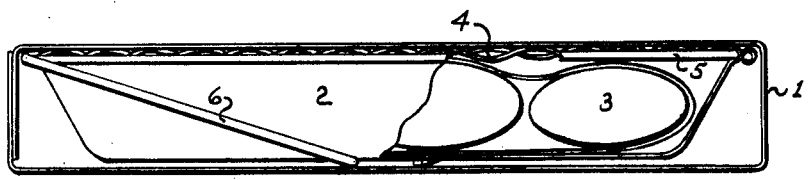
FIGURE 2 is a side view of the box within which the components of the unit are packed, with its side panel removed to show the grill and, partly broken away, the fuel pan.

Referring to the drawings in which the same number refers to the same or a similar part, FIGURE 2 shows the unit as it is received by a user. Box 1 made of fiber board or similar inexpensive, but rigid material, is rectangular in shape, preferably with its lid hinged at one end, and of size to snugly hold within it fuel pan 2, charcoal briquettes 3 and grill 4.

Grill 4, a rectangular sheet of mesh of expanded metal, clasps U-shaped supporting rods 5 along its lateral edges in rotatable engagement.

Rectangular fuel pan 2 of aluminum sheet is formed with a rim and rolled edges. The lateral rims of fuel pan 2 are provided with a pair of holes 8 spaced as shown to accommodate support rods 5 of grill 4. Within the lateral rolled edges are U-shaped rotatable supporting rods 6 having turned-in ends 7. Charcoal briquettes 3 including a self starting agent are contained in the fuel pan and retained in place while in box 1 by the presence of grill 4 above them.

Figure 1:
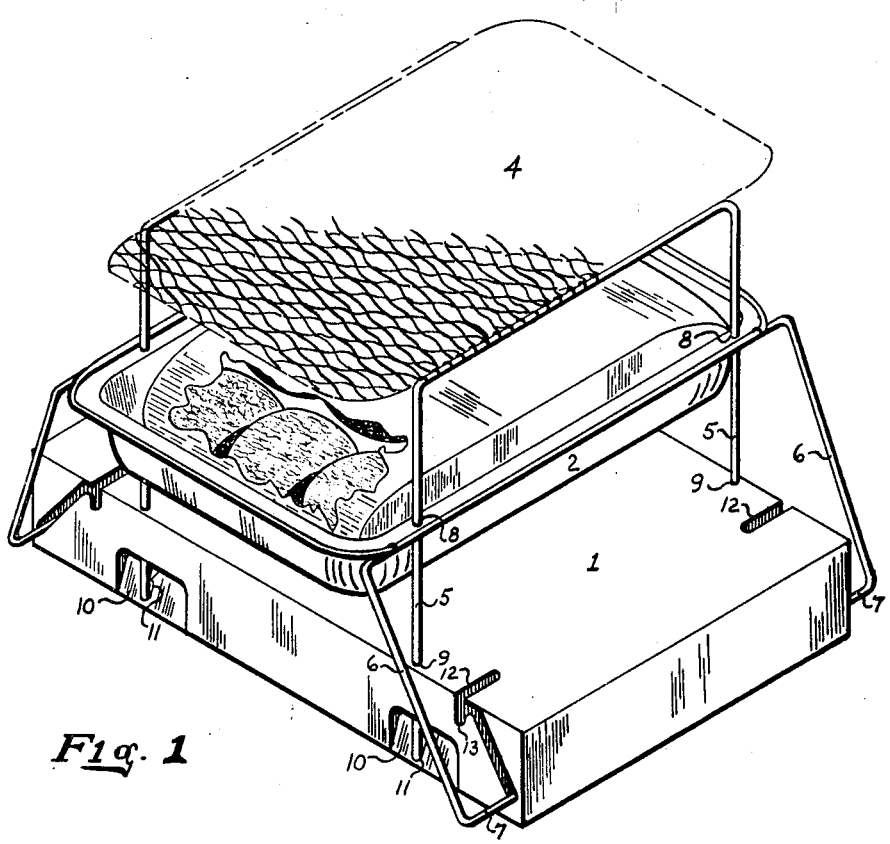
FIGURE 1 is a perspective view of the assembled barbecue unit with the grill the maximum distance from the fuel.
Figure 3:
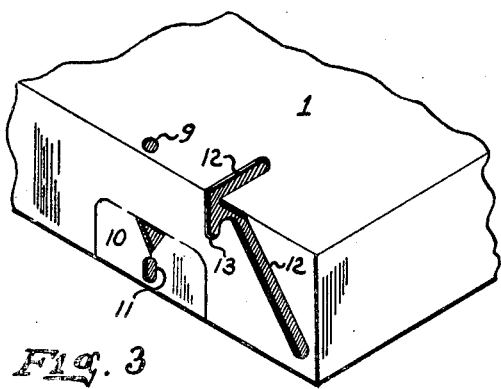
FIGURE 3 is a perspective view of one corner of the box.
Figure 4:
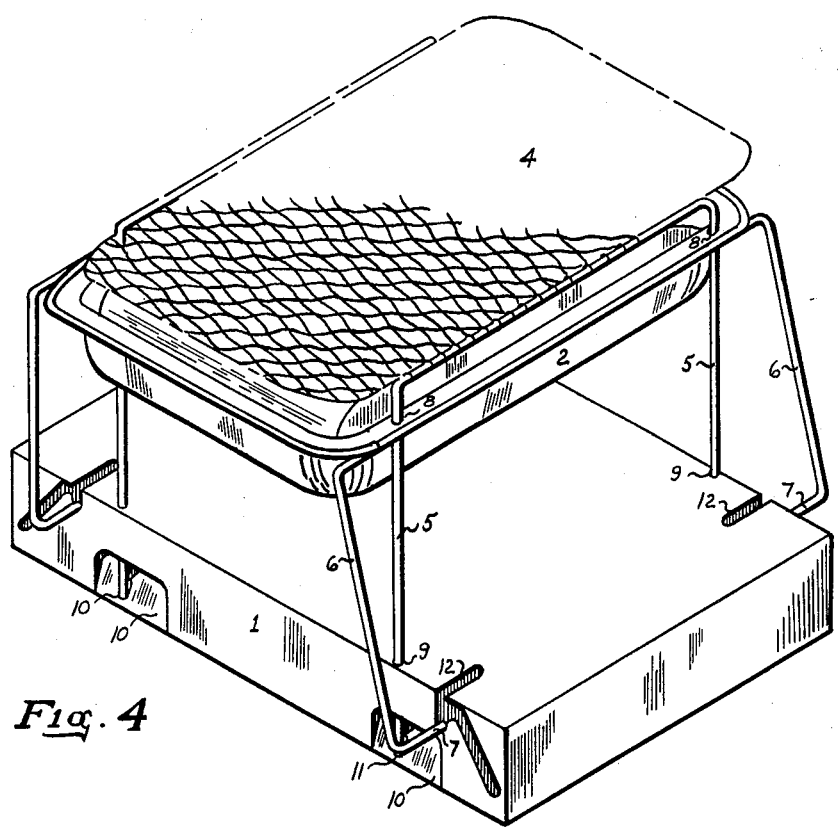
FIGURE 4 is similar to FIGURE 1 but showing the grill positioned a minimum distance from the fuel pan.

The relation of the parts when the unit is fully assembled is seen in FIGURES 1 and 4. The seating provision for supporting rods 5 and 6 in box 1 is shown in FIGURE 3.

Hole 9 is let into the top surface of box 1 at each corner and in registry with it when fuel pan 2 is positioned as in FIGURES 1 and 4 will be hole 8 in the rim of the fuel pan. Push-in tab 10, pre-cut on three sides from the wall of box 1, has a keyhole slot 11 through it. When tab 10 is pressed inward sufficiently far, the hole at the inner end of keyhole slot 11 will be brought in registry with hole 8.

Each leg of supporting rods 5 of grill 4 will, in the assembly, pass through a hole 8 and 9 and keyhole slot 11.

Slotted opening 12 in the top and side surfaces of box 1 permits the entry of turned-in end 7 of fuel pan supporting rod 6 and its bearing, as in FIGURE 1, on the lower end of opening 12, or as in FIGURE 4 in notch 13 of opening 12.

Figure 5:
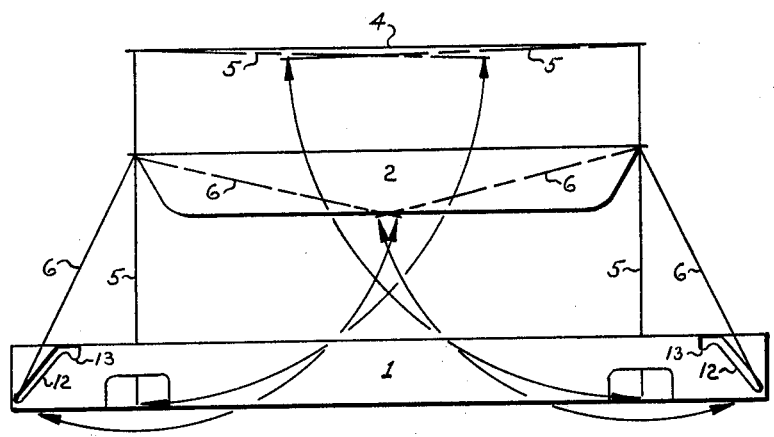
FIGURE 5 is a diagrammatic view of the assembled grill and fuel pan supported on the box showing the paths taken by the unfolded support rods to reach locking positions in the box openings.

As best seen in FIGURE 5 the assembly of the unit is accomplished by removing grill 4 and fuel pan 2 from box 1 and then reclosing the box. Fuel pan supporting rods 6 are then unfolded and the pan positioned transverse the longitudinal axis of box 1. The unfolded rods are then engaged in slotted openings 12 in the desired location. Next grill supporting rods 5 are unfolded and each leg passed through a hole 8, 9 and, while tab 10 is pressed inward, through keyhole slot 11, and brought to bear on the bottom of box 1.

Thus assembled the unit is rigid, the fuel pan is adjustable in height, and the unit is ready for use with self-contained fuel easy to ignite. After use, the unit may be discarded in its entirety.

While certain materials have been specified herein, construction of this unit is not limited to their use. For example while a mesh of expanded metal is shown for grill 4, a wire mesh, or a perforated or foraminous sheet of material of strength sufficient to support the food to be grilled, may be used. Likewise box 1 may be made of other than fiber board and pan 2 of other than aluminum sheet.

Similarly while only one illustration of this invention has been given, modifications may be made without departing from the scope of this invention.

What I claim is:

1. A fueled, self contained, expendable barbecue grill comprising:
    a shallow rectangular box removably containing a noncombustible pan and metallic grill, provided with a cover, and having a plurality of holes through its top and a plurality of slots in its side walls,
        the noncombustible pan having fuel therein, an outwardly extending rim with a plurality of holes therethrough and with foldable legs adapted, when extended, to be supported on the margins of the slots of the box and support the pan a spaced distance above the box;
        the metallic grill coextensive with the pan and with foldable legs adapted, when extended, to pass through the holes in the rim of the pan and the holes in the box and support the grill over the pan and a spaced distance above the box.

2. A fueled, self contained, expendable barbecue grill comprising:
    a shallow rectangular closable box removably containing a noncombustible pan and metallic grill, having a plurality of holes through its top wall and a plurality of notched slots in its side walls,
        the noncombustible pan having fuel therein, an outwardly extending rim with a plurality of holes therethrough and with foldable legs adapted, when extended, to be engaged in such notched slots and support the pan an adjustable distance above the box;
        the metallic grill coextensive with the pan and with foldable legs adapted, when extended, to pass through the holes in the rim of the pan and the holes in the box and support the grill over the pan and a spaced distance above the box.

3. A fueled, self contained, expendable barbecue grill comprising:
   a shallow rectangular box adapted to removably contain the barbecue grill component parts in transportable condition and to support them when assembled for use having:
      a pair of spaced inwardly extending tabs in each side wall, with holes therein, holes in the top wall in registry with the holes in the tabs,
      a slot adjacent each corner extending from the junction of the top wall and a side wall at right angles therefrom a short distance in the top wall and sloping downward therefrom in the side wall with a notch in the lower margin of the sloping portion;
   a rectangular pan of noncombustible material adapted to nest in the box and having
      fuel contained therein,
      an outwardly extending rim, a pair of holes through each lateral rim in registry with the holes in the top wall of the box when the pan is directly above and transverse to the length of the box,
      supporting legs consisting of a U shaped rod with ends turned a short distance inwardly, rotatably mounted along its mid-section on each lateral edge, adapted when extended downward to be supported in the slots of the box with the pan a spaced distance above the box; and
   a metallic grill coextensive with the pan and having supporting legs consisting of a U shaped rod rotatably mounted along its mid-section on each lateral edge and foldable along the shorter edge with its ends adapted to pass through the holes in a lateral rim of the pan and holes in the top wall of the box and to support the grill a fixed distance above the box.

4. A fueled, self contained, expandable barbecue grill comprising:
   a shallow rectangular box adapted to removably contain the barbecue grill component parts in transportable condition and to support them when assembled for use having:
      a pair of spaced inwardly bendable pre-cut tabs in each side wall, with keyhole slots inward of the outer edge of each tab,
      holes in the top wall in registry with the holes in the tabs when the tabs are bent inward of the box,
      a slot adjacent each corner extending from the junction of the top wall and a side wall at right angles therefrom a short distance in the top wall and sloping downward therefrom in the side wall with a notch in the lower margin of the sloping portion;
   a rectangular pan of noncombustible material adapted to nest in the box and having:
      fuel contained therein,
      an outwardly extending rim,
      a pair of holes through each lateral rim in registry with the holes in the top of wall of the box when the pan is directly above and transverse to the length of the box,
      supporting legs consisting of a U shaped rod with ends turned a short distance inwardly, rotatably mounted along its mid-section on each lateral edge, foldable along the shorter sides of the pan and adapted when extended to be supported on the margins of the slots of the box with the pan an adjustable spaced distance above the box; and
   a metallic grill coextensive with the pan and having:
      supporting legs consisting of a U shaped rod rotatably mounted along its mid-section on each lateral edge and foldable along the shorter edge with its ends adapted to pass through the holes in a lateral rim of the pan and holes in the top wall of the box and to support the grill a fixed distance above the box.

References Cited
UNITED STATES PATENTS

| 1,540,434 | 6/1925 | Stone | 126—9 |
| 2,874,631 | 2/1959 | Cooksley. | |
| 3,394,693 | 7/1968 | Robinson. | |

CHARLES J. MYHRE, Primary Examiner

U.S. Cl. X.R.

126—25